United States Patent [19]

Wakasa et al.

[11] 3,959,772

[45] May 25, 1976

[54] TWO-WIRE SIGNAL TRANSMISSION SYSTEM

[75] Inventors: Yutaka Wakasa; Hisayuki Uchiike; Koju Kataoka; Yasuro Takiura, all of Musashino, Japan

[73] Assignee: Yokogawa Electric Works, Ltd., Tokyo, Japan

[22] Filed: June 17, 1975

[21] Appl. No.: 587,619

[30] Foreign Application Priority Data

June 20, 1974 Japan ............................... 49-70536
June 20, 1974 Japan ............................... 49-70537

[52] U.S. Cl. ........................ 340/167 A; 340/310 R; 340/409

[51] Int. Cl.² ........................................... H04Q 9/14

[58] Field of Search........ 340/167 A, 167 R, 310 R, 340/310 A, 147 R, 409

[56] References Cited

UNITED STATES PATENTS 3,392,374 7/1968 Grace............................. 340/167 R

*Primary Examiner*—Harold I. Pitts
*Attorney, Agent, or Firm*—Parmelee, Johnson & Bollinger

[57] ABSTRACT

A signal transmission system of the type used in process control systems for conveying a signal between a field telemetering instrument and a central controller, or between a central controller and a process control device. The signal transmission system is arranged with a transmitter accepting an input signal, a transmission line for carrying a transmission signal, and a receiver receiving the transmission signal and developing an output signal.

In accordance with the invention, converter means in the transmitter develop a pulse width signal with a duration corresponding in a predetermined manner to the value of the input signal, and means in the transmitter provide the transmission signal (e.g., a current signal) with two states (e.g., opposite polarities), one of which has a duration corresponding to the duration of the pulse width signal. Means in the receiver provide the output signal with a duration corresponding to the duration of the one transmission signal state, which corresponds in turn to the value of the input signal, and can be used for conversion to digital or analog form. Means in one of the transmitter or receiver supplies power for the transmission signal, and means in the other of the transmitter or receiver derives operational power, e.g., for the telemetering instrument, from the transmission signal. The signal transmission system thus is able to convey signals with less susceptibility to noise, while at the same time retaining the ability to convey operational power.

16 Claims, 7 Drawing Figures

TWO-WIRE SIGNAL TRANSMISSION SYSTEM

BACKGROUND OF THE INVENTION

1. Field of the Invention

The present invention relates to signal transmission systems and more particularly to systems used in process control for conveying signals between a field telemetering instrument and a central controller, or between a central controller and a process control device. The central controller in such process control systems often uses digital control, and field instruments are often remote from the central controller and communications therebetween are carried out with two cable transmission lines.

2. Description of the Prior Art

Various arrangements have been proposed for transmitting signals in process control systems. In one such arrangement, process signals are transmitted through two cable transmission lines in analog current form, with a current range of 4 to 20 milliamperes corresponding to a range of 0 to 100% of the signal to be transmitted. In such a system, not only are the process signals transmitted, but the transmission signal itself also carries electrical power useful for operating field instruments or process control devices. Prior art systems of this general type have not been fully satisfactory for conveying process signals, however, because the signals are subject to noise interference, especially when the transmission line is lengthened as a result of system expansion. The noise interference can be particularly bothersome in digital control applications.

SUMMARY OF THE INVENTION

It is a principal object of this invention to provide an improved signal transmission system for use in process control systems for conveying signals between field instruments and central controllers, or between central controllers and process control devices. It is a specific object of the invention to provide a signal transmission system which is less affected by noise interference but is still capable of transmitting operational power along with the process signal, and is easily converted to digital or analog amplitude form. Still another object of the invention is to provide a signal transmission system of the type described which is more suitable for commercial use.

In a preferred embodiment of the invention to be described hereinbelow in detail, the signal transmission system comprises a transmitter arranged to accept an input signal, and converter means in the transmitter for developing a pulse width signal with a duration corresponding in a predetermined manner to the value of the input signal. Means in the transmitter provide a transmission signal, e.g., a current signal, with two states, e.g., opposite polarities, and this means responds to the converter means to cause the duration of one of the transmission signal states to correspond to the duration of the pulse width signal. A transmission line carries the pulse width modulated two state transmission signal to a receiver, and means in the receiver develop an output signal with a duration corresponding to the duration of the one transmission signal state, which in turn corresponds to the value of the input signal. Means are located in one of the transmitter or receiver for supplying power for the transmission signal, and in the other of the transmitter or receiver are located means for deriving operational power from the transmission signal. This arrangement permits process signals to be transmitted with less susceptibility to noise interference, while permitting power to be conveyed.

In more detailed aspects of the invention, the transmission signal is a bipolar current signal and the transmitter and receiver are arranged with means forming two current loops through the transmission line, the two loops constraining current to flow in opposite polarities. A switch in one loop is controlled by the converter to cause duration of one current polarity to correspond in a predetermined manner to the value of the input signal. Means are provided for sensing the cessation of current in this current loop, and switch means are provided for causing current to flow with the opposite polarity for the remainder of an operational cycle determined by a time base circuit.

Other objects, aspects and advantages of the invention will be pointed out in, or apparent from, the detailed description hereinbelow considered together with the following drawings.

DESCRIPTION OF THE PREFERRED EMBODIMENTS

Figure 1:
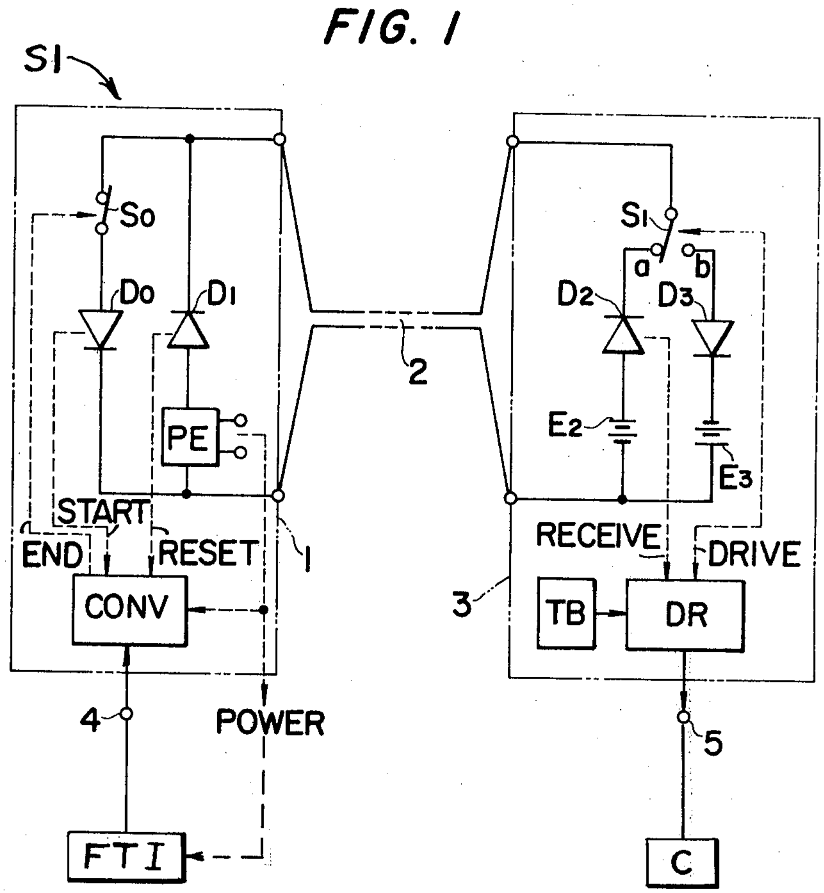
FIG. 1 is a block diagram showing a signal transmission system of one embodiment of the invention.

One signal transmission system S1 constructed in accordance with the invention is shown in block form in FIG. 1 and comprises an input terminal 4, a transmitter 1, a two cable transmission line 2, a receiver 3, and an output terminal 5. Within the transmitter and receiver are diode circuits $D_0$, $D_1$, $D_2$ and $D_3$, an analog to pulse width converter CONV, a power source PE, a steady frequency time-base circuit TB, a drive circuit DR, DC sources $E_2$ and $E_3$, an on-off switch $S_0$, and a selector switch $S_1$.

Figure 2:
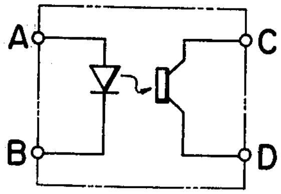
FIG. 2 is a circuit diagram showing a photo-coupler used for purposes of the invention.

The transmitter 1 and the receiver 3 typically are remote from each other, being connected only by way of the two cable transmission line 2. A signal to be transmitted is supplied to the input terminal 4 from a field telemetering instrument FTI and led to the converter CONV. A corresponding output signal to a controller C (e.g., a digital computer) is provided from the drive circuit DR through the terminal 5. The converter CONV and drive circuit DR are coupled to diode circuits $D_0$, $D_1$, $D_2$, and $D_3$, which allow current to flow forward as indicated in FIG. 1 and in addition are capable of detecting and indicating the flow of current. Each diode circuit may be in the form of a photo-coupler as shown in FIG. 2, wherein the flow of current across terminals A and B through a light emitting diode junction will cause conduction through an optically coupled transistor connected across terminals C and D.

In the transmitter 1, the diode circuit $D_0$ is connected across the two cables of the transmission line 2 through the on-off switch $S_0$, and the series circuit comprising diode circuit $D_1$ and power source PE also is connected across the two cables of the transmission line 2 with the diode circuit $D_0$ being oriented oppositely to the diode circuit $D_1$. The output signals START and RESET of the diode circuits $D_0$ and $D_1$, indicating current flow therethrough, are supplied to the converter CONV. The switch $S_0$ closes or opens its contact according to a command signal END from the converter CONV.

In Receiver 3, selector switch $S_1$ is arranged to connect either circuit *a* or *b* across the two cables of the transmission line 2. Circuit *a* comprises diode circuit $D_2$ and DC source $E_2$ which are (1) oriented relative to one another in the same direction with respect to the flow of current and (2) oriented relative to diode current $D_0$ so that a current loop can be formed with diode circuit $D_2$, transmission line 2, and diode circuit $D_0$. In a similar manner, circuit *b* comprises diode circuit $D_3$ and DC source $E_3$ which are (1) oriented relative to one another in the same direction with respect to the flow of current, and (2) oriented relative to diode circuit $D_1$ so that a current loop can be formed with diode circuit $D_3$, transmission line 2, and diode circuit $D_1$. The output signal RECEIVE of the diode circuit $D_2$, which indicates the flow of current therethrough, is led to the output terminal 5 through the drive circuit DR. The selector switch $S_1$ connects circuits *a* and *b* to the transmission line 2 under the control of a signal DRIVE from drive circuit DR, which in turn is operated under the control of time-base circuit TB.

Figure 3:
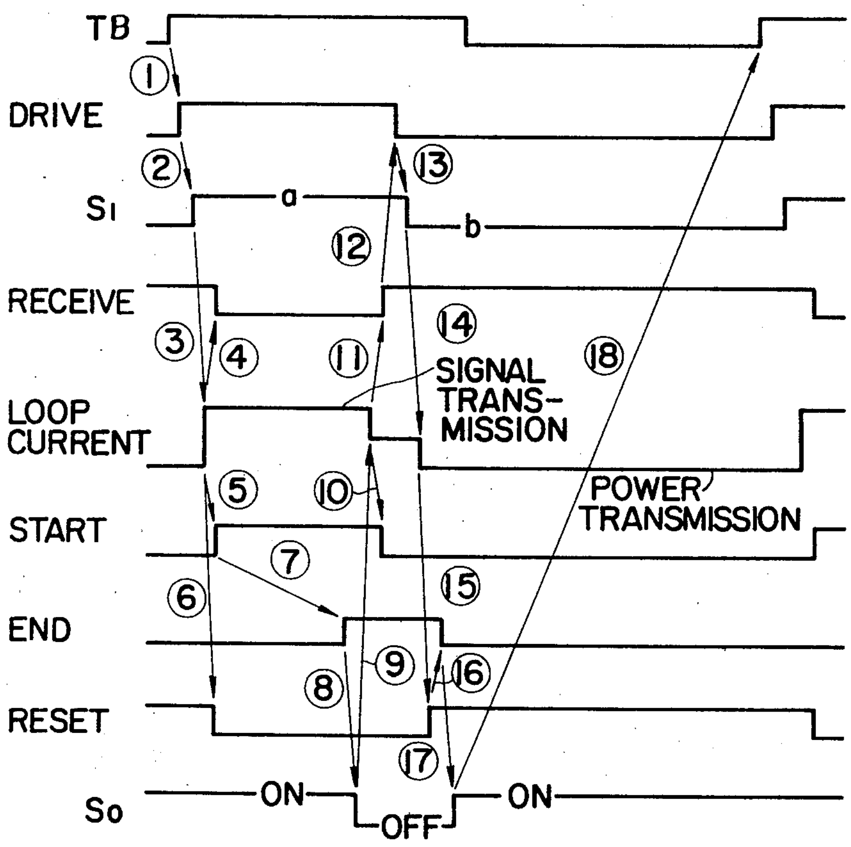
FIG. 3 is a timing diagram useful for illustrating the operation of the system shown in FIG. 1, FIGS. 4, 5 and 7 are diagrams showing other embodiments of the invention.

The operation of signal transmission system $S_1$ is shown by the timing diagram of FIG. 3, which illustrates the operational states of individual circuit components and signals therein during one cycle of operation of the system of FIG. 1 as determined by time-base circuit TB. The encircled numerals shown in FIG. 3 correspond to those which follow hereunder to guide the description of a series of operations performed in the system.

(1.) At the beginning of a cycle of operation, the drive signal DRIVE rises under the control of the signal from the time-base circuit TB.

(2.) The DRIVE signal causes the selector switch $S_1$ to close its contact *a*.

(3.) The switch $S_0$ is initially closed and thus a current flows through the loop comprising the elements $E_2$, $D_2$, transmission line 2, $S_0$, and $D_0$. This flow of current is taken as the direction in which the process signals are transmitted.

(4.) This current is detected by the diode circuit $D_2$, causing the signal RECEIVE to the drive circuit DR to fall.

(5.) Concurrently, the diode circuit $D_0$ causes the signal START to the converter CONV to rise.

(6.) Concurrently, the diode circuit $D_1$ causes the signal RESET to the converter CONV to fall.

(7.) The signal START drives the converter CONV so that the analog signal applied at input terminal 4 to convey process data is converted into a pulse width proportional to its analog value. Upon completing the conversion of analog value to pulse width, converter CONV sends a signal END to the switch $S_0$.

(8.) The signal END opens the switch $S_0$.

(9.) The loop current through $D_0$ and $D_2$ is cut off.

(10.) The signal START from the diode circuit $D_0$ falls.

(11.) The diode circuit $D_2$ detects the loop current cutoff and sends a signal RECEIVE to the drive circuit DR.

(12.) As a result of the signal RECEIVE, the drive current DR causes the signal DRIVE to the selector switch $S_1$ to fall.

(13.) The selector switch $S_1$ closes its contact *b*.

(14.) A current flows through the loop comprising the elements $S_1$, $D_3$, $E_3$, transmission line PE, and $D_1$ in the direction in which power is transmitted to the instrument power source PE.

(15.) The diode circuit $D_1$ detects this loop current and sends a signal RESET to the converter CONV.

(16.) The converter CONV causes the signal END to the switch $S_0$ to fall.

(17.) As a result, the switch $S_0$ closes and the transmitter 1 returns to its initial state, but current continues to flow through the loop comprising $D_1$ and PE.

(18.) This state is maintained for about a half cycle to the end of one cycle of operation as determined by the time-base circuit TB. During this half cycle, power necessary for the field telemetering instrument FTI and for transmitter 1 is stored in the power source circuit PE.

The duration of the loop current in the direction of signal transmission, i.e., the period for which the signal RECEIVE from the diode circuit $D_2$ to the drive circuit DR is absent, represents the value of the signal transmitted. This pulse width signal can be converted to digital form by leading it to a gate circuit to allow a clock pulse to pass for the period corresponding to the pulse width. Similarly, when a constant voltage source is turned on-off by the pulse-wdith signal, and the resultant on-off current is smoothed, the analog signal can be restored.

Figure 4:
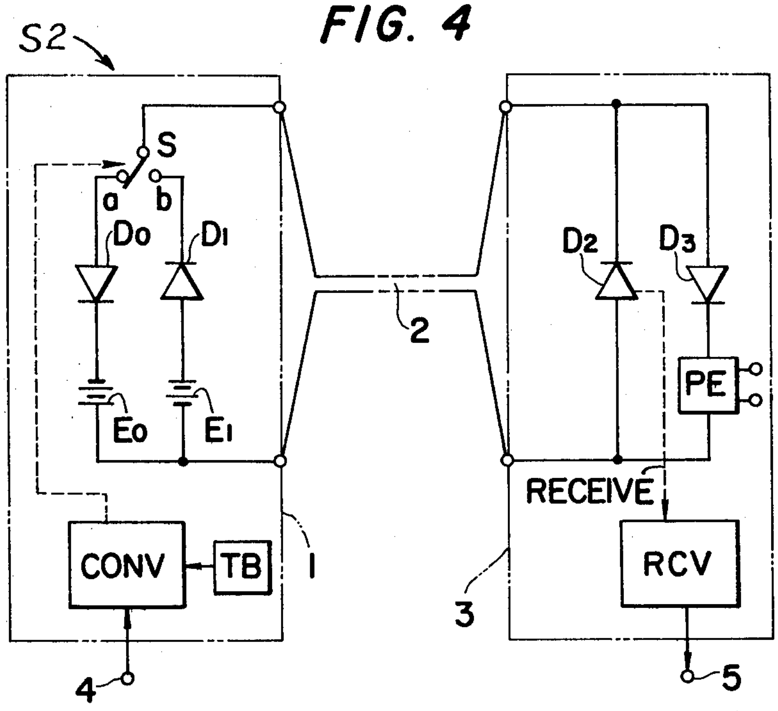

FIG. 4 is a block diagram showing another signal transmission system $S_2$ according to the invention wherein the transmitter 1 is arranged with DC sources and supplies power to the receiver 3. This embodiment is suited, for example, for the transmission of signals to control the output of a field process control system (not shown). In signal transmission system $S_2$, the transmitter comprises a selector switch S under the control of converter CONV and arranged to select between a circuit a comprising DC source $E_0$ in series with diode circuit $D_0$, and a circuit *b* comprising DC source $E_1$ in series with diode circuit $D_1$. A time-base circuit TB controls converter CONV. The period during which the switch S is connected to circuit *a* is for signal transmission and the period during which it is connected to circuit *b* is for power transmission. The receiver 2 comprises a power source circuit PE in series with a diode circuit $D_3$, and a receiving circuit RCV in place of the drive circuit used in system $S_1$.

Transmission system $S_2$ is operated in the following manner. At the beginning of a cycle of operation, the selector switch S is connected to circuit *a*. This switch position is sustained by converter CONV for a period proportional to the value of a signal at input terminal 4 to be transmitted. In this state, current flows through the loop comprising the elements S, $D_0$, $E_0$, transmission line 2 and $D_2$. The diode circuit $D_2$ detects this current and sends a signal RECEIVE to the receiver RCV. At the end of the period corresponding to the value of the signal transmitted, the selector switch S is connected to circuit *b*. As a result, current flows through the loop comprising elements $E_1$, $D_1$, S, transmission line 2, $D_3$, and PE. Power is stored in the power source circuit PE from which the receiver 3 and process control system derives necessary power. The signal supplied to the receiver 3 is defined in terms of a period for which the signal RECEIVE from the diode circuit $D_2$ to the receiver RCV is present.

Figure 5:
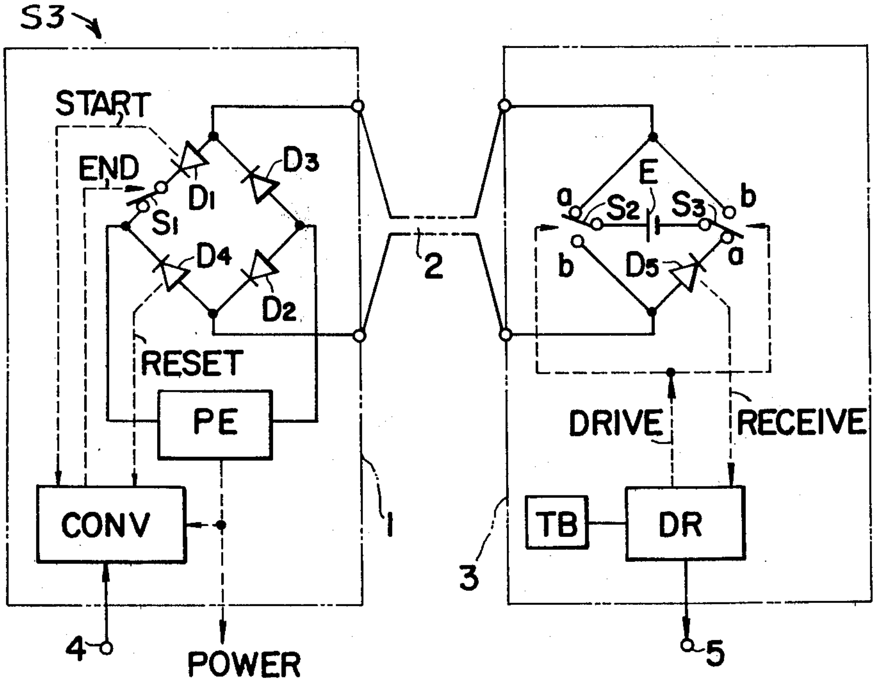

FIG. 5 is a block diagram showing still another signal transmission system $S_3$ according to the invention, wherein transmitter 1 comprises diodes $D_1$ through $D_4$, an on-off switch $S_1$, a converter CONV, and a power source circuit PE, and wherein receiver 3 comprises a time-base circuit RB, a drive circuit DR, a DC source E, a diode $D_5$, and selector switches $S_2$ and $S_3$. A signal to be transmitted is supplied to the input terminal 4 from an instrument and thence to the converter CONV. An output signal to a controller is derived from the drive circuit DR by way of the terminal 5. The diode circuits $D_1$, $D_4$, and $D_5$ are capable of detecting and indicating the flow of current therethrough, and supply START and RESET signals to converter CONV and a RECEIVE signal to drive circuit DR. The diodes $D_1$ through $D_4$ are connected in a current-rectifying bridge configuration to send current through the power source circuit PE in a single direction, irrespective of the polarity of current passing through the transmission line 2. The on-off switch $S_1$ is connected in series with the diode $D_1$ and operated under the control of an END signal from converter CONV.

In the receiving circuit 3, the current from the DC source E is connected to flow through the transmission line 2, and to have its polarity controlled by switches $S_2$ and $S_3$ which are interlinked with each other and operated in common by a DRIVE signal from drive circuit DR. When the switches $S_1$ and $S_2$ are on contacts *a*, a loop current passes through the source E and diode $D_5$, in the receiver, and through the diode $D_1$, switch $S_1$ power source circuit PE, and diode $D_2$ in the transmitter. The RECEIVE signal output of the diode $D_5$ is led to the output terminal 5 through the drive circuit DR which is controlled by the time-base circuit TB.

Figure 6:
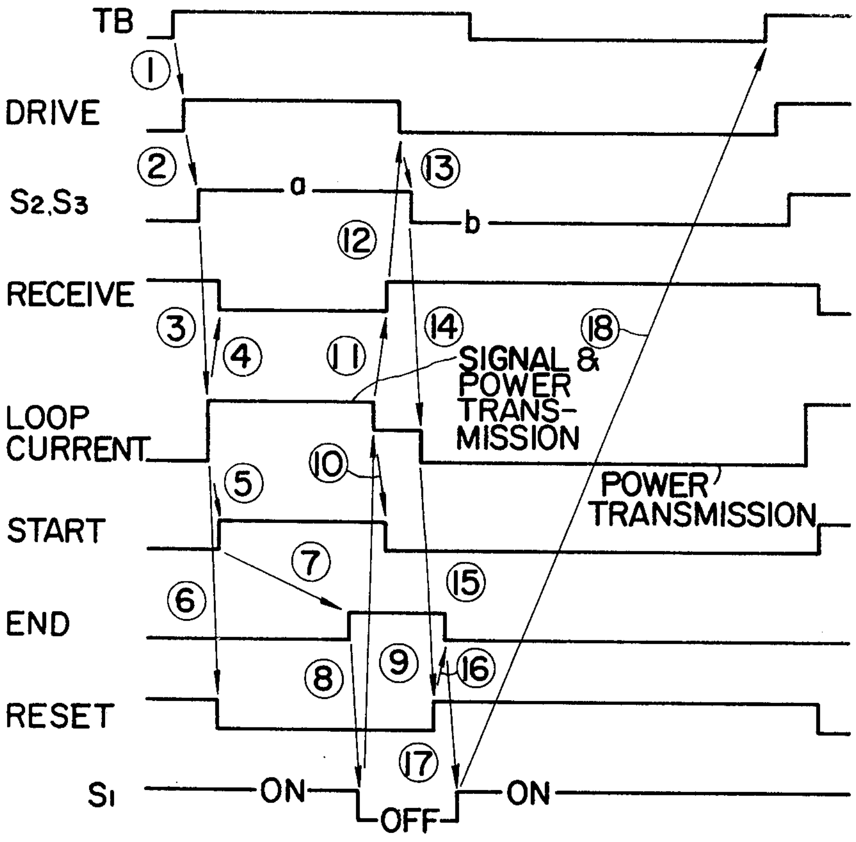
FIG. 6 is a timing diagram useful for illustrating the operation of the system shown in FIG. 5.

The operation of signal transmission system $S_3$ is shown by the timing diagram of FIG. 6, which depicts the operational states of the elements and signals of FIG. 5 for the duration of one cycle of operation. The encircled numerals shown in FIG. 6 correspond to those listed below for the description of a series of operations performed in the system.

(1.) At the beginning of one cycle of operation as determined by time-base circuit TB, the drive signal DRIVE rises.

(2.) The drive signal causes the selector switches $S_2$ and $S_3$ to connect with contacts *a*.

(3.) Because the switch $S_1$ is closed initially, a current flows through the loop comprising elements $D_5$, $S_3$, $S_2$ transmission line 2, $D_1$, $S_1$, PE, and $D_2$. This flow of current is the direction in which process signals are transmitted.

(4.) The loop current is detected by diode $D_5$, causing the signal RECEIVE to the drive circuit DR to fall.

(5.) Concurrently, the diode $D_1$ causes the signal START to the converter CONV to rise.

(6.) Concurrently, no current flows in the diode $D_4$, causing the signal RESET to the converter CONV to fall.

(7.) The signal START drives the converter CONV so that an analog signal at input terminal 4 conveying process data is converted into a pulse width proportional to its analog value. Upon completing the conversion of analog value to pulse width, the converter CONV sends a signal END to the switch $S_1$.

(8.) The signal END opens the switch $S_1$.

(9.) The loop current is cut off.

(10.) The diode $D_1$ detects that the loop current is cut off, and thus causes the signal START to the converter CONV to fall.

(11.) The diode $D_5$ in the receiver detects that the loop current is cut off, and thus causes the signal RECEIVE to the drive circuit DR to rise.

(12.) The drive circuit DR thereby causes the signal DRIVE to fall.

(13.) As a result, the switches $S_2$ and $S_2$ are all connected with contacts *b*.

(14.) A current starts flowing through the loop comprising elements $S_3$, $S_2$, transmission line 2, $D_4$, PE and $D_3$.

(15.) The diode $D_4$ on the transmission side detects the loop current and sends a signal RESET to the converter CONV.

(16.) Upon receipt of the signal RESET, the converter CONV causes the signal END to fall.

(17.) The switch $S_1$ returns to its initial state.

(18.) This state is sustained to the end of one cycle of operation as determined by time-base circuit TB.

The duration of the loop current through contacts *a*, i.e., the period during which the signal RECEIVE from the diode $D_5$ to the drive circuit DR is absent, represents the value of the signal transmitted. The power required in the transmitter 1 and in the telemetering instrument connected to terminal 4 is derived from the current flowing in the power source circuit PE for most of the cycle of operation.

Figure 7:
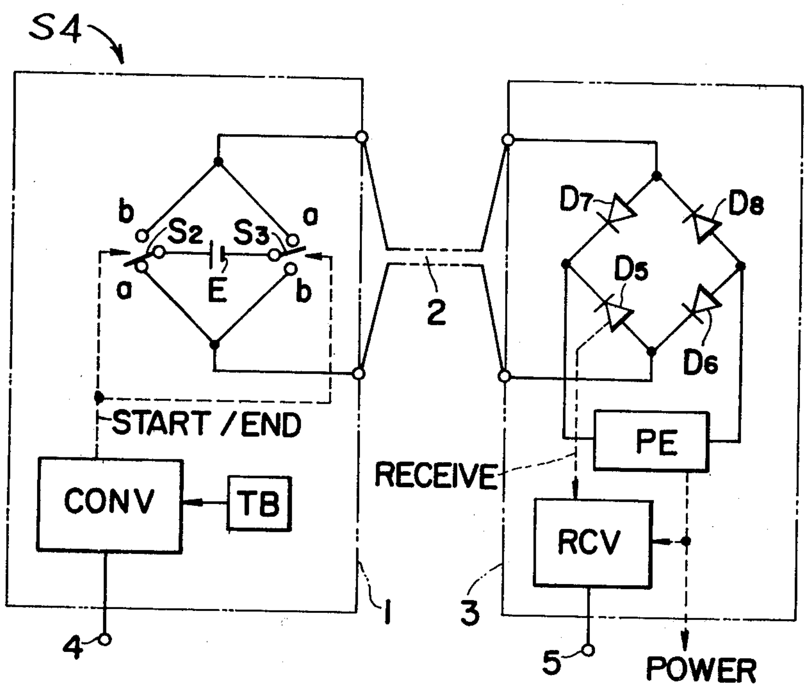

FIG. 7 is a block diagram showing another signal transmission system S4 according to the invention, wherein the transmitter 1 is provided with a DC source from which power used in the receiver 3 is derived. Hence this system, like system $S_2$ depicted in FIG. 4, is suited for the transmission of signals to be used for controlling the output of a process control system. System $S_4$ comprises a transmitter 1 with a DC source E and selector switches $S_2$ and $S_3$ for controlling the polarity of the loop current. The receiver 2 comprises diodes $D_5$ through $D_8$ in a current-rectifying bridge configuration, which allows current to flow in a single direction through the power source circuit PE. The output of the diode $D_5$, i.e., the signal RECEIVE, appears at the output terminal 5 through the receiver circuit RCV. The time-base circuit TB is located in the transmitter and controls operation of the converter CONV.

System S4 is operated in the following manner. At the beginning of a cycle of operation, the converter CONV generates the signal START, causing the selector switches $S_2$ and $S_3$ to connect with contacts *a*. This state is sustained for a period determined by converter CONV to the proportional value of the signal applied to input terminal 4 to be transmitted. During this state, current flows through the loop comprising elements $S_3$, E, $S_2$, transmission line 2, $D_5$, PE and $D_8$. The diode $D_5$ detects the loop current and sends a signal RECEIVE to the receiver RCV. When the period ends, converter CONV causes the switches $S_2$ and $S_3$ to connect with the contacts *b*, causing current to flow through the loop comprising elements $S_3$, E, $S_2$, transmission line 2, $D_7$, PE and $D_6$. In this state, no current flows in the diode $D_5$, and the signal RECEIVE is absent. The receiver 3 thus receives a transmitted signal in terms of the duration of the signal RECEIVE supplied from the diode $D_5$ to the receiver RCV, and obtains power from the current flowing in the power source circuit PE.

Thus, according to the present invention, the value of a signal to be transmitted is given in terms of pulse width. Such a signal maximizes ease of analog-to-digital conversion and restoration of an analog signal on the receiving side. Furthermore, the system of the invention is readily compatible with digital systems, as well as with analog systems. The pulse-width modulated signal is less affected by external noises than is the analog current amplitude signal which typically has been used in prior art signal transmission systems. Furthermore, in the embodiments of the system shown in FIGS. 5 and 7, the signal transmission current is rectified to flow in the power source circuit PE, from which the power required in the system is derived.

In the preferred embodiments described above, signal transmission and power transmission are carried out by changing the polarity of the loop current. Instead, the value of current, the polarity of voltage, or the value of voltage may be changed in a pulse width-modulated manner to set up transmission systems handling both signals and power. Moreover, in the embodiments described above, the pulse width signal to be transmitted is proportional to the analog value signal. Instead of such a proportional relationship, a logarithmic relationship, an exponential relationship, a square relationship, or another functional relationship may be used for the two signals. Similarly, although a photo-coupler is suggested by way of example for the purpose of detecting and indicating the current flowing in the diode, other electronic circuits may be used to perform the same functions as the photo-coupler.

Although specific embodiments of the invention have been described herein in detail, it is to be understood that this is for the purpose of illustrating the invention, and should not be construed as necessarily limiting the scope of the invention, since it is apparent that many changes can be made to the disclosed structures by those skilled in the art to suit particular applications.

We claim:

1. A signal transmission system of the type used in process control systems for conveying a signal between a field instrument and a central controller, or between a central controller and a process control device, comprising:

- a transmitter arranged to accept an input signal;
- converter means in the transmitter for developing a pulse width signal with a duration corresponding in a predetermined manner to the value of the input signal;
- means in the transmitter for providing a transmission signal with two states, said means being responsive to the converter means to cause the duration of one of the transmission signal states to correspond to the duration of the pulse width signal;
- a transmission line for carrying the transmission signal;
- a receiver for receiving the transmission signal;
- means in the receiver for developing an output signal with a duration corresponding to the duration of the one transmission signal state, whereby the duration of the output signal corresponds in said predetermined manner to the value of the input signal;
- means, in one of the transmitter or receiver, for supplying power for the transmission signal; and
- means, in the other of the transmitter or receiver, for deriving operational power from the transmission signal;
- whereby the signal transmission system is able to convey signals less affected by noise, and is also able to convey operational power.

2. A signal transmission system as claimed in claim 1 wherein the means for providing a transmission signal with two states comprises means for generating a current signal with two polarities, means in the transmitter and receiver connected to the transmission line for providing two different current loops for the two different polarities of the current signal, and switch means in one of said loops responsive to the converter means to cause the duration of the current flowing in that loop to correspond to the duration of the pulse width signal.

3. A signal transmission system as claimed in claim 2 wherein said loops include diode circuits arranged to control the polarity of current in the loops, and to detect and indicate the flow of current in the loops.

4. A signal transmission system as claimed in claim 3 wherein said diode circuits comprise a diode photo-coupled to a transistor.

5. A signal transmission system as claimed in claim 1 wherein the input signal is an analog signal and wherein the converter means develops a pulse width signal having a duration proportional to the value of the analog input signal.

6. A signal transmission system as claimed in claim 1 wherein the transmission signal is a current signal with different polarities forming its two states, and wherein the means in the receiver for developing an output signal with a duration corresponding to the duration of the one transmission signal state comprises means for detecting and indicating the flow of current in the polarity corresponding to the one state.

7. A signal transmission system as claimed in claim 6 wherein the detecting and indicating means comprises a diode circuit for controlling the polarity of current flow and for detecting and indicating the flow of current therethrough.

8. A signal transmission system as claimed in claim 7 wherein the diode circuit comprises a diode photo-coupled to a transistor.

9. A signal transmission system as claimed in claim 1 wherein the means for supplying power for the transmission signal is located in the receiver, and the means for deriving operational power from the transmission signal is located in the transmitter.

10. A signal transmission system as claimed in claim 1 wherein the means for supplying power for the transmission signal is located in the transmitter, and the means for deriving operational power from the transmission signal is located in the receiver.

11. A signal transmission system as claimed in claim 1 wherein the transmission signal is a current signal having different polarities as its two states, and wherein the means for deriving operational power from the transmission signal further comprises rectifier means for supplying a unidirectional current from the bipolar transmission signal.

12. A signal transmission system as claimed in claim 1 further comprising time base circuit means for generating a steady pulse signal to time a cycle of operation of the signal transmission system, and the signal transmission system is arranged to convey the one transmission signal state with a duration corresponding to the value of the input signal during each cycle of operation as determined by the time base circuit means.

13. A signal transmission system as claimed in claim 1 wherein the transmission signal is a current signal having opposite polarities as its two states, the transmitter and receiver comprise means forming a first current loop of one polarity through the transmission line and means forming a second current loop of opposite polarity through the transmission line, the means for forming the first current loop of said one polarity containing switch means responsive to the converter means for causing the duration of the one polarity of transmission signal current to correspond to the duration of the pulse width signal, the signal transmission system further comprising time base circuit means for determining a cycle of operation and means for switching the transmission signal current into said second current loop of opposite polarity for the remainder of a cycle of operation as determined by the time base circuit means.

14. A signal transmission system as claimed in claim 13 wherein the means for switching the transmission signal current to said second current loop of opposite polarity comprises means in said first loop for detecting and indicating the cessation of current flow therein, and means responsive to the indicated cessation of current flow for switching connection of the transmission line between two circuits containing oppositely directed voltage sources.

15. A signal transmission system as claimed in claim 14 wherein the two circuits containing oppositely directed voltage sources comprise parallel circuits each containing an individual voltage source and the switching means comprises a single switch for connecting the selected circuit.

16. A signal transmission system as claimed in claim 14 wherein the two circuits containing oppositely directed voltage sources comprise a single voltage source and the switching means comprises a pair of switches for connecting the single voltage source in opposite senses into the circuit.

* * * * *